United States Patent
Sakurada

(10) Patent No.: US 11,409,305 B2
(45) Date of Patent: Aug. 9, 2022

(54) DRIVING ASSISTANCE SYSTEM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/747,643

(22) Filed: Jan. 21, 2020

(65) Prior Publication Data
US 2020/0272166 A1 Aug. 27, 2020

(30) Foreign Application Priority Data

Feb. 27, 2019 (JP) .............................. JP2019-034671

(51) Int. Cl.
| | |
|---|---|
| G05D 1/02 | (2020.01) |
| G01S 3/802 | (2006.01) |
| B60W 60/00 | (2020.01) |
| B60W 40/02 | (2006.01) |
| G01S 15/931 | (2020.01) |

(52) U.S. Cl.
CPC ............ *G05D 1/0255* (2013.01); *B60W 40/02* (2013.01); *B60W 60/00259* (2020.02); *G01S 3/802* (2013.01); *B60W 2420/54* (2013.01); *B60W 2554/4041* (2020.02); *B60W 2554/80* (2020.02); *G01S 15/931* (2013.01)

(58) Field of Classification Search
CPC ................. B60W 40/02; B60W 50/14; B60W 60/00259; B60W 2420/54; B60W 2554/4041; B60W 2554/4049; B60W 2554/80; B60W 2556/45; G01S 3/802; G01S 5/18; G01S 11/14; G01S 15/931; G05D 1/0255

See application file for complete search history.

(56) References Cited

U.S. PATENT DOCUMENTS

| | | | | |
|---|---|---|---|---|
| 2013/0188794 | A1* | 7/2013 | Kawamata | G01S 3/803 381/56 |
| 2014/0136096 | A1* | 5/2014 | Funayama | G01S 3/808 701/300 |
| 2014/0241126 | A1* | 8/2014 | Funayama | G01S 11/14 367/129 |
| 2017/0096138 | A1* | 4/2017 | Reiff | G05D 1/0255 |
| 2018/0114445 | A1* | 4/2018 | Jang | B60R 1/00 |

(Continued)

FOREIGN PATENT DOCUMENTS

| | | |
|---|---|---|
| CN | 106028227 A | 10/2016 |
| CN | 106560365 A | 4/2017 |

(Continued)

*Primary Examiner* — Peter D Nolan
*Assistant Examiner* — Ce Li Li
(74) *Attorney, Agent, or Firm* — Oliff PLC

(57) ABSTRACT

A driving assistance system includes a plurality of vehicles on which a plurality of microphones is mounted respectively and a server having an acquisition unit configured to acquire sound signals recorded by the microphones and position information of the vehicles. The server further has an estimation unit configured to estimate a position of one or more sound sources based on the sound signals and the position information and a providing unit configured to provide the estimated position of the one or more sound sources to the vehicles.

8 Claims, 4 Drawing Sheets

(56) References Cited

U.S. PATENT DOCUMENTS

| | | |
|---|---|---|
| 2018/0332385 A1 | 11/2018 | Takahashi et al. |
| 2019/0116418 A1 | 4/2019 | Teo et al. |
| 2019/0280664 A1* | 9/2019 | Kawauchi ................ G08G 1/16 |
| 2020/0031337 A1* | 1/2020 | Soltanian ............... H04R 1/406 |
| 2020/0193817 A1* | 6/2020 | Hwang ................ H04B 1/3822 |
| 2020/0241552 A1* | 7/2020 | Leenayongwut ....... G10L 25/51 |
| 2021/0168496 A1* | 6/2021 | Hehn ....................... H04R 3/04 |
| 2022/0041101 A1* | 2/2022 | Yamazaki ............. H01L 27/108 |

FOREIGN PATENT DOCUMENTS

| | | | |
|---|---|---|---|
| CN | 108293161 A | 7/2018 | |
| DE | 102004045690 A1 * | 6/2005 | .............. G01S 5/22 |
| JP | H06-344839 A | 12/1994 | |
| JP | 2014-153927 A | 8/2014 | |
| WO | 2018/101429 A1 | 6/2018 | |

* cited by examiner

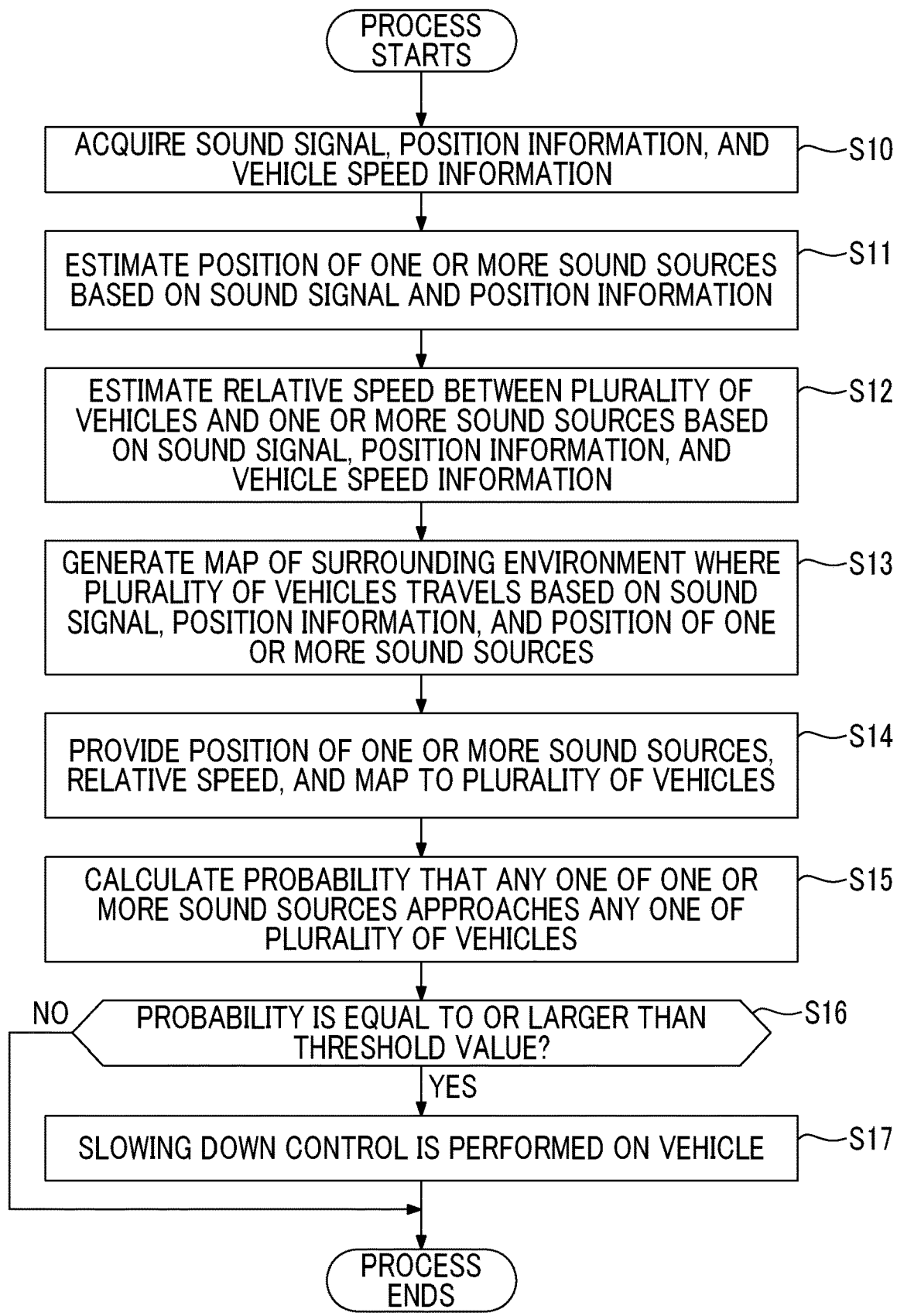

DRIVING ASSISTANCE SYSTEM

INCORPORATION BY REFERENCE

The disclosure of Japanese Patent Application No. 2019-034671 filed on Feb. 27, 2019 including the specification, drawings and abstract is incorporated herein by reference in its entirety.

BACKGROUND

1. Technical Field

The disclosure relates to a driving assistance system.

2. Description of Related Art

In the related art, there is a known technique of collecting sounds with a plurality of microphones installed on the front, rear, right, and left of a vehicle, obtaining a phase difference between sound signals, and estimating a distance between a sound source and a host vehicle and a direction of the sound source, for example, as described in the following Japanese Unexamined Patent Application Publication No. 2014-153927 (JP 2014-153927 A).

SUMMARY

However, a sound source that exists in a blind spot may not be captured since sound signals that can be collected by a single vehicle are limited.

The disclosure provides a driving assistance system capable of estimating a position of a sound source more accurately.

A first aspect of the disclosure relates to a driving assistance system including a plurality of vehicles on which a plurality of microphones is mounted respectively, and a server having an acquisition unit configured to acquire sound signals recorded by the microphones and position information of the vehicles. The server further has an estimation unit configured to estimate a position of one or more sound sources based on the sound signals and the position information and a providing unit configured to provide the estimated position of the one or more sound sources to the vehicles.

According to the aspect, it is possible to estimate the position of the sound source more accurately by estimating the position of the sound source based on the sound signals recorded by the vehicles and the position information of the vehicles.

In the above aspect, the acquisition unit may further acquire vehicle speed information of the vehicles, and the estimation unit may estimate relative speeds between the vehicles and the one or more sound sources based on the sound signals, the position information, and the vehicle speed information.

According to the aspect, it is possible to estimate the relative speed between the vehicle and the sound source in consideration of the Doppler effect and thus to estimate a relative movement of the sound source with respect to the vehicle.

In the above aspect, the server may further include a generation unit configured to generate a map of a surrounding environment where the vehicles travel based on the sound signals, the position information, and the position of the one or more sound sources.

According to the aspect, it is possible to provide information on the region forming the blind spot of the vehicle and information on the road surface state to the driver by generating the map of the surrounding environment where the vehicles travel based on the sound signals recorded by the vehicles and the position information of the vehicles.

In the above aspect, the server may further include a slowing down controller configured to calculate a probability that any one of the one or more sound sources approaches any one of the vehicles and slow down the vehicle when the probability is equal to or larger than a threshold value.

According to the aspect, it is possible to cause the vehicle to slow down before a distance between the vehicle and the sound source becomes short and thus to improve the safety.

In the above aspect, the slowing down controller may calculate the probability based on at least one of the sound signals, the number of vehicles under slowing down control among the vehicles, a history that the probability is equal to or larger than the threshold value, information on a date and time when the sound signals are acquired, and information on a surrounding environment where the vehicles travel.

According to the aspect, it is possible to calculate the probability that the sound source approaches the vehicle more accurately.

According to the disclosure, it is possible to provide the driving assistance system capable of estimating the position of the sound source more accurately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart of a process executed by the server according to the embodiment.

DETAILED DESCRIPTION OF EMBODIMENTS

Figure 1:
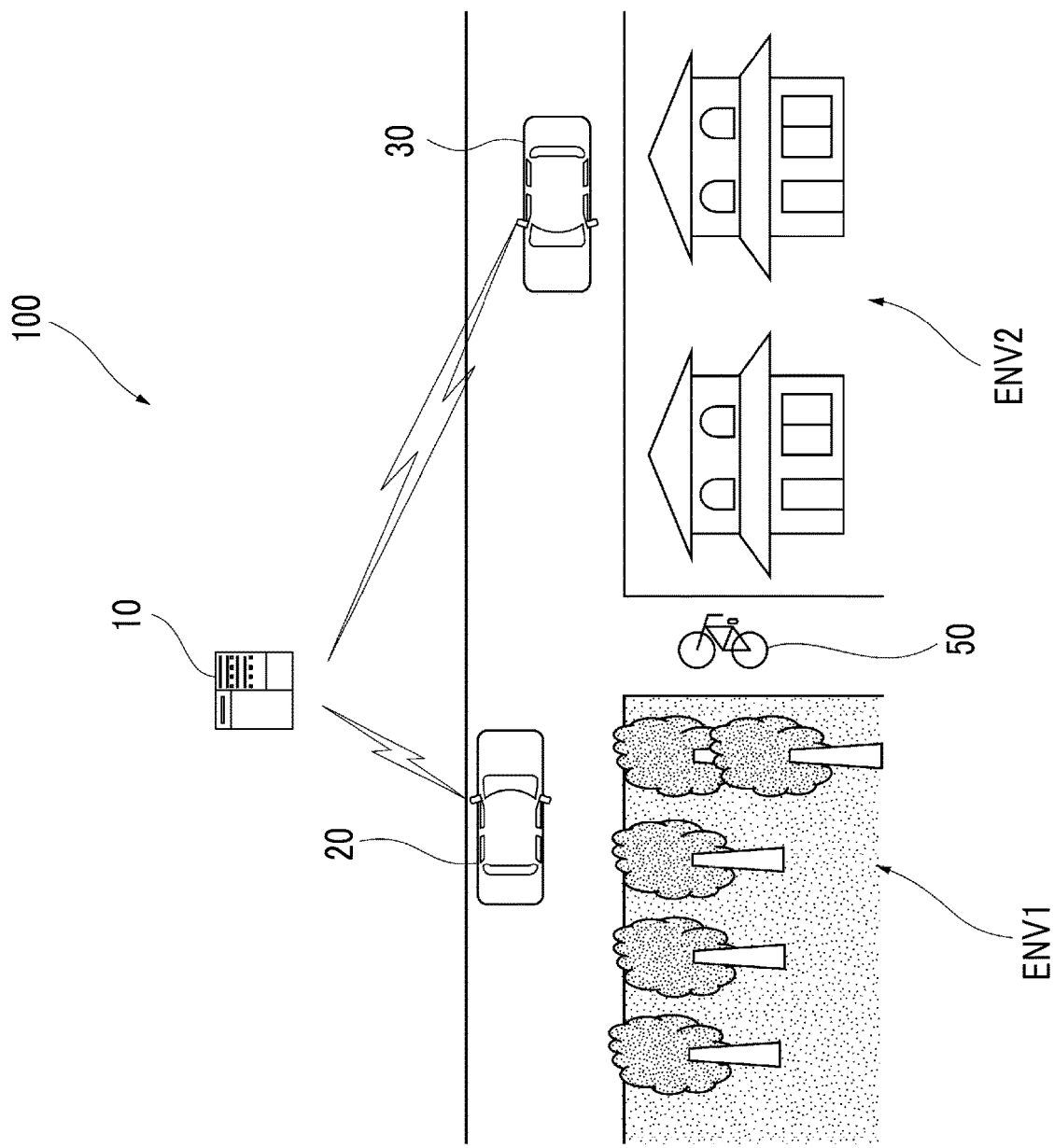
FIG. 1 is a diagram showing an outline of a driving assistance system according to an embodiment of the disclosure.

Embodiments of the disclosure will be described with reference to accompanying drawings. In each drawing, elements to which the same reference numeral is assigned have the same or similar configuration.

FIG. 1 is a diagram showing an outline of a driving assistance system 100 according to the embodiment of the disclosure. The driving assistance system 100 includes a server 10, a first vehicle 20, and a second vehicle 30. A plurality of microphones is mounted respectively on the first vehicle 20 and the second vehicle 30. The first vehicle 20 and the second vehicle 30 may mount a sensor for measuring a position of a host vehicle, for example, a global positioning system (GPS) receiver. The server 10 acquires sound signals recorded by the microphones mounted on the first vehicle 20 and the second vehicle 30 and position information of the first vehicle 20 and the second vehicle 30 to estimate a position of one or more sound sources 50. In the example shown in FIG. 1, the sound source 50 is a bicycle. Although the embodiment will be described when the driving assistance system 100 includes two vehicles, any number of vehicles included in the driving assistance system 100 may be employed.

The bicycle that is the sound source 50 travels on a road with a forest ENV1 on a left side and a residential area ENV2 on a right side, and approaches a T-junction from a position which becomes a blind spot of the second vehicle 30 by being blocked by the residential area ENV2. In such a case, it is difficult to estimate the approach of the sound source 50 with high accuracy solely by the sound signals recorded by the microphones mounted on the second vehicle 30. The server 10 according to the embodiment estimates the position of the sound source 50 based on the sound signals of the sound source 50 recorded by the microphones mounted on the first vehicle 20 through the forest ENV1 and the position information of the first vehicle 20. The server 10 provides the estimated position of the sound source 50 to the first vehicle 20 and the second vehicle 30. Accordingly, it is possible for a driver of the second vehicle 30 to know that the sound source 50 approaches from the blind spot and thus to travel safely.

As described above, with the driving assistance system 100 according to the embodiment, the position of the sound source 50 is estimated based on the sound signals recorded by a plurality of vehicles 20, 30 and the position information of the vehicles 20, 30. Therefore, it is possible to estimate the position of the sound source 50 more accurately.

Figure 2:
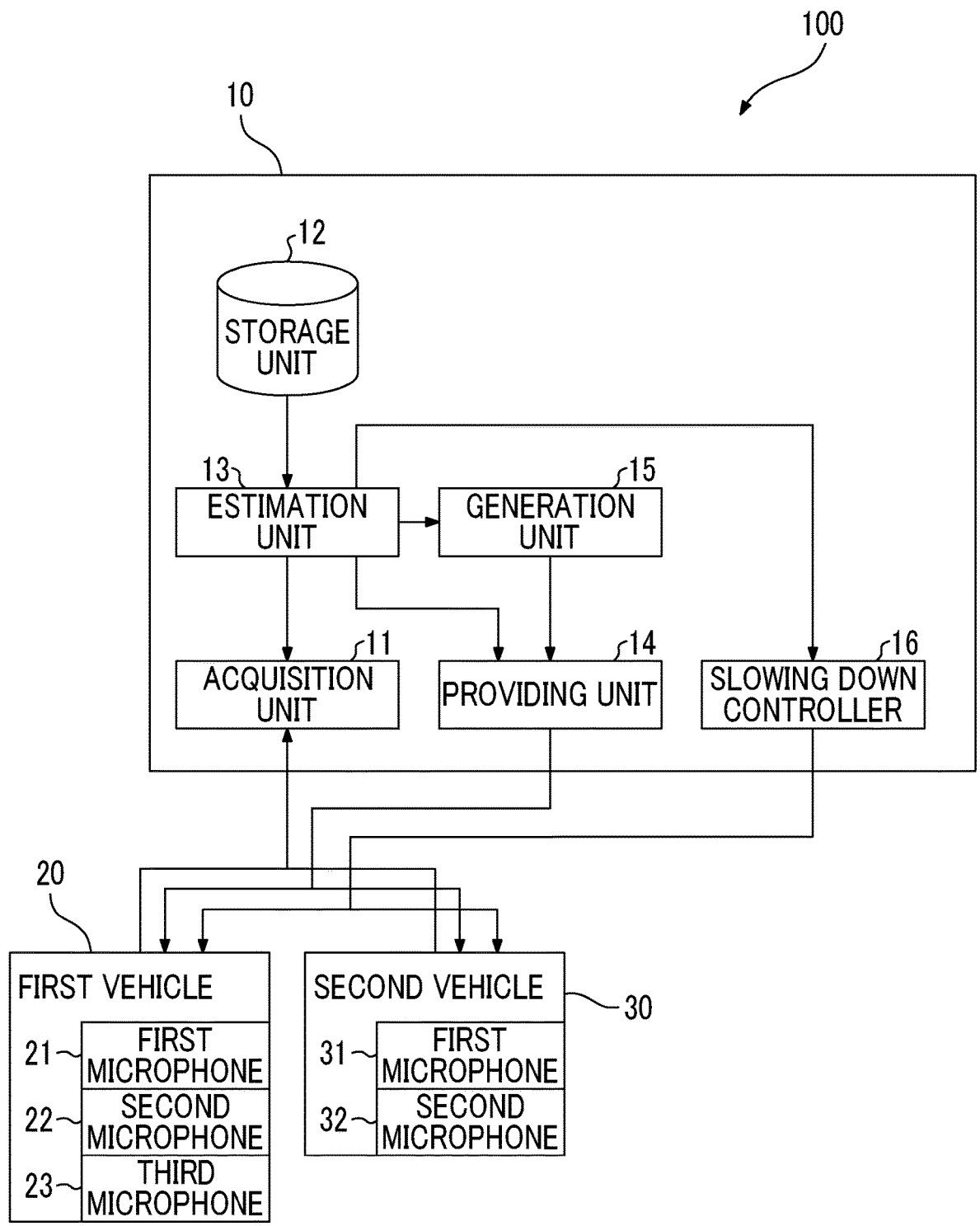
FIG. 2 is a diagram showing a functional block of the driving assistance system according to the embodiment.

FIG. 2 is a diagram showing a functional block of the driving assistance system 100 according to the embodiment. The driving assistance system 100 includes the server 10, the first vehicle 20, and the second vehicle 30. The server 10 includes an acquisition unit 11, a storage unit 12, an estimation unit 13, a providing unit 14, a generation unit 15, and a slowing down controller 16. The first vehicle 20 includes a first microphone 21, a second microphone 22, and a third microphone 23. The second vehicle 30 includes a first microphone 31 and a second microphone 32.

The acquisition unit 11 acquires the sound signals recorded by the microphones (first microphone 21, second microphone 22, third microphone 23, first microphone 31, and second microphone 32) and the position information of the vehicles (first vehicle 20 and second vehicle 30). The acquisition unit 11 may acquire the sound signals and the position information from the first vehicle 20 and the second vehicle 30 through a wireless communication network. The acquisition unit 11 may further acquire vehicle speed information of the vehicles. The acquisition unit 11 may store the sound signals, the position information, and the vehicle speed information in the storage unit 12 in association with acquired times.

The storage unit 12 stores sound signals, position information, and vehicle speed information acquired in the past. The storage unit 12 may store information indicating a type of the sound source 50 in association with the sound signals, the position information, and the vehicle speed information.

The estimation unit 13 estimates the position of the one or more sound sources 50 based on the sound signals and position information of the vehicles. The estimation unit 13 may estimate the position of the one or more sound sources 50 based on a disposition of the microphones mounted on the vehicle, intensity of the sound signal, and the position information of the vehicle, and match the estimated position with the position of the one or more sound sources 50 estimated from the vehicles 20, 30 to improve estimation accuracy.

The estimation unit 13 may estimate relative speeds between the vehicles 20, 30 and the one or the sound sources 50 based on the sound signals, the position information, and the vehicle speed information. With the addition of the vehicle speed information, it is possible to estimate the relative speeds between the vehicles 20, 30 and the sound source 50 in consideration of the Doppler effect and thus to estimate a relative movement of the sound source 50 with respect to the vehicles 20, 30.

The providing unit 14 provides the estimated position of the one or more sound sources 50 to the vehicles 20, 30. The providing unit 14 may provide the estimated position of the sound source 50 to the first vehicle 20 and the second vehicle 30 through a wireless communication network. Accordingly, it is possible for the drivers of the vehicles 20, 30 to confirm the position of the sound source 50 in the blind spot and thus to travel safely.

The generation unit 15 generates a map of a surrounding environment where the vehicles 20, 30 travel based on the sound signals, the position information, and the position of the one or more sound sources 50. For example, the generation unit 15 may estimate that there is the forest ENV1 between the sound source 50 and the first vehicle 20 and there is the residential area ENV2 between the sound source 50 and the second vehicles 30 from the fact that a transmission way of the sound generated from the sound source 50 differs between the first vehicle 20 and the second vehicle 30 to generate the map. Further, the generation unit 15 may estimate a road surface state based on a change in the sound from the sound source 50 generated by a difference in the road surface state to generate the map. As described above, the map of the surrounding environment where the vehicles 20, 30 travel is generated based on the sound signals recorded by the vehicles 20, 30 and the position information of the vehicles 20, 30. Therefore, it is possible to provide information on the region forming the blind spot of the vehicle and information on the road surface state to the driver.

The slowing down controller 16 calculates a probability that any one of the one or more sound sources 50 approaches any one of the vehicles 20, 30 and slows down the vehicle when the probability is equal to or larger than a threshold value. Here, when the probability that any one of the one or more sound sources 50 approaches any one of the vehicles 20, 30 is equal to or larger than the threshold value, the storage unit 12 may store information on a sound signal, position information, vehicle speed information, and date and time related to the event. For example, when a probability that the sound source 50 approaches the second vehicle 30 is calculated and the probability is equal to or larger than the threshold value, the slowing down controller 16 may forcibly slow down the second vehicle 30. Accordingly, it is possible to cause the vehicle to slow down before a distance between the vehicle and the sound source becomes short and thus to improve the safety.

The slowing down controller 16 may calculate the probability that the sound source 50 approaches the vehicle based on at least one of the sound signals, the number of vehicles under slowing down control among the vehicles 20, 30, a history that the probability that the sound source 50 approaches the vehicle is equal to or larger than the threshold, information on a date and time when the sound signals are acquired, and information on the surrounding environment where the vehicles 20, 30 travel. Accordingly, it is possible to calculate the probability that the sound source approaches the vehicle more accurately.

Figure 3:
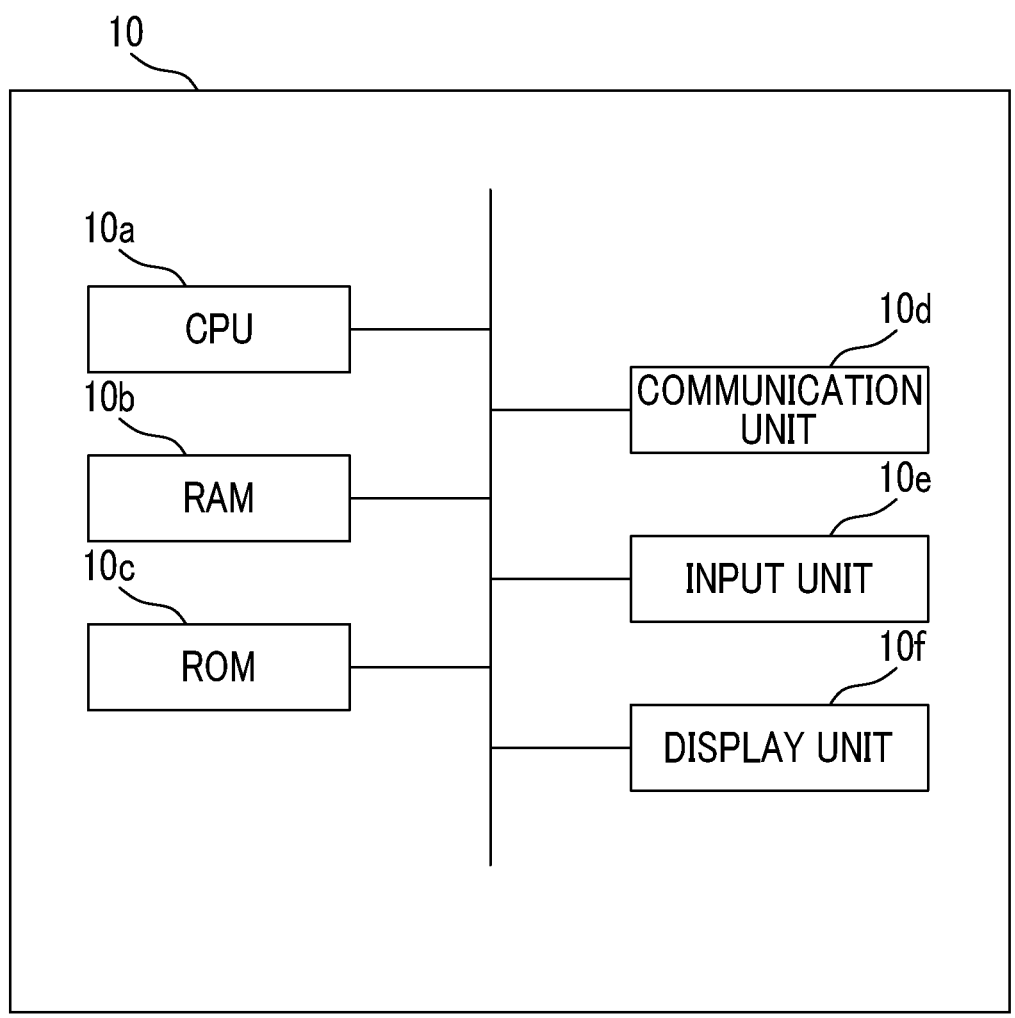
FIG. 3 is a diagram showing a physical configuration of a server according to the embodiment.

FIG. 3 is a diagram showing a physical configuration of the server 10 according to the embodiment. The server 10 includes a central processing unit (CPU) 10a corresponding to a calculation unit, a random access memory (RAM) 10b corresponding to a storage unit, a read only memory (ROM) 10c corresponding to the storage unit, a communication unit 10d, an input unit 10e, and a display unit 10f. Each of the configurations is mutually connected so as to be able to transmit and receive data through a bus. In the example, the case where the server 10 is configured of one computer is described, but the server 10 may be formed by combining a plurality of computers. The configuration shown in FIG. 3 is an example, and the server 10 may have a configuration other than the configurations or may not have some of the configurations.

The CPU 10a is a controller that performs control related to the execution of a program stored in the RAM 10b or the ROM 10c, and performs calculation and processing of data. The CPU10a is a calculation unit configured to execute a program (driving assistance program) that estimates the position of the one or more sound sources based on the sound signals and the position information which are acquired from the vehicles. The CPU 10a receives various pieces of data from the input unit 10e or the communication unit 10d, and displays a calculation result of the data on the display unit 10f or stores the result in the RAM 10b or the ROM 10c.

The RAM 10b is a storage unit configured to be able to rewrite data and may be configured of, for example, a semiconductor storage element. The RAM 10b may store the program executed by the CPU 10a and the pieces of data such as the sound signal, the position information, and the vehicle speed information. The above is an example, and the RAM 10b may store data other than the above or may not store some of the above.

The ROM 10c is a storage unit configured to be able to read data and may be configured of, for example, a semiconductor storage element. The ROM 10c may store, for example, the driving assistance program or data that is not rewritten.

The communication unit 10d is an interface that connects the server 10 to other apparatuses. The communication unit 10d may be connected to a communication network N such as the Internet.

The input unit 10e receives a data input from a user and may include, for example, a keyboard and a touch panel.

The display unit 10f visually displays the calculation result by the CPU 10a and may be configured of, for example, a liquid crystal display (LCD). The display unit 10f may display, for example, a map generated by the generation unit 15.

The driving assistance program may be provided by being stored in a computer-readable storage medium such as the RAM 10b or the ROM 10c or may be provided through a communication network to be connected by the communication unit 10d. In the server 10, the CPU 10a executes the driving assistance program to realize operations of the acquisition unit 11, the estimation unit 13, the providing unit 14, the generation unit 15, and the slowing down controller 16 described with reference to FIG. 2. The physical configurations are examples and may not be requested to be independent configurations. For example, the server 10 may include a large-scale integration (LSI) in which the CPU 10a and the RAM 10b or the ROM 10c are integrated.

FIG. 4 is a flowchart of a process executed by the server 10 according to the embodiment. First, the server 10 acquires the sound signals, the position information, and the vehicle speed information from the vehicles 20, 30 (S10).

The server 10 estimates the position of the one or more sound sources 50 based on the sound signals and the position information (S11).

Further, the server 10 estimates the relative speeds between the vehicles 20, 30 and the one or the sound sources 50 based on the sound signals, the position information, and the vehicle speed information (S12).

Thereafter, the server 10 generates the map of the surrounding environment where the vehicles 20, 30 travel based on the sound signals, the position information, and the position of the one or more sound sources 50 (S13).

The server 10 provides the position of the one or more sound sources 50, the relative speeds, and the map thereof to the vehicles 20, 30 (S14).

Further, the server 10 calculates the probability that any one of the one or more sound sources 50 approaches any one of the vehicles 20, 30 (S15). Here, when the calculated probability is equal to or larger than the threshold value (YES in S16), the slowing down control is performed on a vehicle having an approaching probability of the sound source 50 that is equal to or larger than the threshold value (S17). Thus, the process by the server 10 ends. The server 10 may repeat the above process.

The embodiments described above are intended to facilitate the understanding of the disclosure and are not intended to limit the disclosure. Each component included in the embodiments and the disposition, material, condition, shape, size, and the like thereof are not limited to the above illustrated and can be changed as appropriate. Further, the configurations shown in different embodiments can be partially replaced or combined with each other.

What is claimed is:

1. A driving assistance system comprising:
   a plurality of vehicles on which a plurality of microphones are mounted respectively; and
   a server including a processor, the processor being configured to:
      acquire sound signals recorded by the plurality of microphones in the plurality of vehicles and position information of the plurality of vehicles,
      estimate a position of one or more sound sources based on the acquired sound signals and the acquired position information, and
      transmit the estimated position of the one or more sound sources to the plurality of vehicles.

2. The driving assistance system according to claim 1, wherein the processor is configured to:
   acquire vehicle speed information of the plurality of vehicles; and
   estimate relative speeds between the plurality of vehicles and the one or more sound sources based on the acquired sound signals, the acquired position information, and the acquired vehicle speed information.

3. The driving assistance system according to claim 1, wherein the processor is configured to generate a map of a surrounding environment where the plurality of vehicles travel based on the acquired sound signals, the acquired position information, and the estimated position of the one or more sound sources.

4. The driving assistance system according to claim 1, wherein the server further has a slowing down controller configured to (i) calculate a probability that any one of the one or more sound sources approaches any one of the plurality of vehicles, and (ii) slow down the one vehicle when the calculated probability is equal to or larger than a threshold value.

5. The driving assistance system according to claim 4, wherein the slowing down controller calculates the probability based on at least one of the sound signals, a number of vehicles under slowing down control among the plurality of vehicles, a history that the probability is equal to or larger than the threshold value, information on a date and time when the sound signals are acquired, and information on a surrounding environment where the plurality of vehicles travel.

6. The driving assistance system according to claim 1, wherein:
   the plurality of vehicles includes a first vehicle and a second vehicle; and
   the processor is configured to:
      estimate the position of one or more sound sources based on sound signals recorded by the first vehicle and position information of the first vehicle, and
      transmit the estimated position of the one or more sound sources to the second vehicle.

7. The driving assistance system according to claim 1, wherein the server includes a memory storing information indicating a type of each of the one or more sound sources.

8. The driving assistance system according to claim 1, wherein the processor is configured to match the position of one or more sound sources estimated by the server with a position of the one or more sound sources estimated by the plurality of vehicles.

* * * * *